United States Patent [19]
Middleton

[11] 3,708,154
[45] Jan. 2, 1973

[54] PRODUCTION OF FOUNDRY CORES

[75] Inventor: Terence H. Middleton, Shirley, England

[73] Assignees: British Leyland (Austin-Morris) Limited, Birmingham; The Borden Chemical Company (U.K.) Limited, Southampton, England

[22] Filed: July 8, 1970
[21] Appl. No.: 53,124

[52] U.S. Cl. ..........................259/2, 164/5, 164/201, 259/154, 259/163
[51] Int. Cl. ..............................B01f 7/04, B01f 7/16
[58] Field of Search ........164/5, 157, 201; 259/2, 64, 259/152, 153, 154, 161, 162, 163, 165

[56] References Cited

UNITED STATES PATENTS 3,464,677   9/1969   Sutter.................................259/154

Primary Examiner—Robert W. Jenkins
Assistant Examiner—Alan I. Cantor
Attorney—Holcombe, Wetherill & Brisebois

[57] ABSTRACT

A machine for producing resin-bonded cold-setting foundry cores on a flow-production basis comprising means for delivering two segregated mixes, of sand and resin and of sand and hardener respectively, into a mixing device to produce a homogeneous final mix of all the materials, together with means for blowing the final mix into a delivery manifold, and for blowing inert backing material to impel the whole of the cold-setting mix from the delivery manifold into a core-box.

4 Claims, 7 Drawing Figures

PRODUCTION OF FOUNDRY CORES

This invention relates to the manufacture of resin-bonded cold-setting foundry cores on a flow-production basis.

It is a well-known fact that, to blow any foundry core satisfactorily, it is necessary to have a residual quantity of backing material, amounting to upwards of 300 percent of the volume of the core, left in the blow-head after the core has been blown. But this requirement creates a problem when it is desired to produce resin-bonded cores on a continuous basis by the so-called 'cold-box' method, in which the heat needed to effect cross-linking of the resin is derived solely from the exothermic chemical reaction that takes place between the resin and a hardener. The problem referred to arises from the fact that curing is initiated as soon as the resin and hardener are brought together in a mixing chamber, preparatory to blowing the core, and therefore the above-mentioned backing material (which remains in the blow-head after the blowing of the core) has also started to cure and, consequently, would not serve to produce a satisfactory core when blown in the ensuing cycle of the continuous process.

The object of the present invention is to enable resin-bonded cold-setting foundry cores to be manufactured on a flow-production basis, by making provision to obviate, as far as practicable, the problem already explained. To this end, according to the invention, a method of producing such cores comprises: pre-mixing metered quantities of core sand and resin on the one hand, and of core sand and hardener on the other hand, so that the core can be blown without there being any appreciable residue of cold-setting material; delivering the two segregated mixes into a final mixing chamber to produce a homogeneous final mix of all the materials; applying an air-blast to blow the final mix into a delivery manifold; transferring the delivery manifold to a blow-head which contains a charge of inert sand to be used as a backing material; clamping the delivery manifold between the blow-head and a core-box; and blowing the inert backing material so that this impels the whole of the cold-setting mix from the delivery manifold into the core-box.

Some of the inert backing material remains in the delivery manifold after the core has been blown, and it is a subsidiary feature of the invention to make provision for returning this material automatically to the blow-head.

The invention includes a machine for carrying out the method defined above, this machine comprising: two separate mixers for producing the segregated mixes; a dual hopper for receiving those mixes; a dual metering unit; a common feeder means for delivering the combined mixes into the final mixing chamber; a compressed air reservoir from which delivery pipes having time-controlled valves lead to the final mixing chamber and to the blow-head respectively; a transfer manifold from which the delivery manifold receives the final mix; and power-operated means effective to cause the delivery manifold to be positioned alternately beneath the transfer manifold and beneath the blow-head.

A further feature of the machine outlined above is that by means of an air-blast derived from the time-controlled valve in the air-delivery pipe to the final mixing chamber, the inert backing material remaining in the delivery manifold after the core has been blown is returned to the blow-head through a recirculating manifold fitted with an automatic shutter.

Referring to the accompanying drawings.

Figure 1:
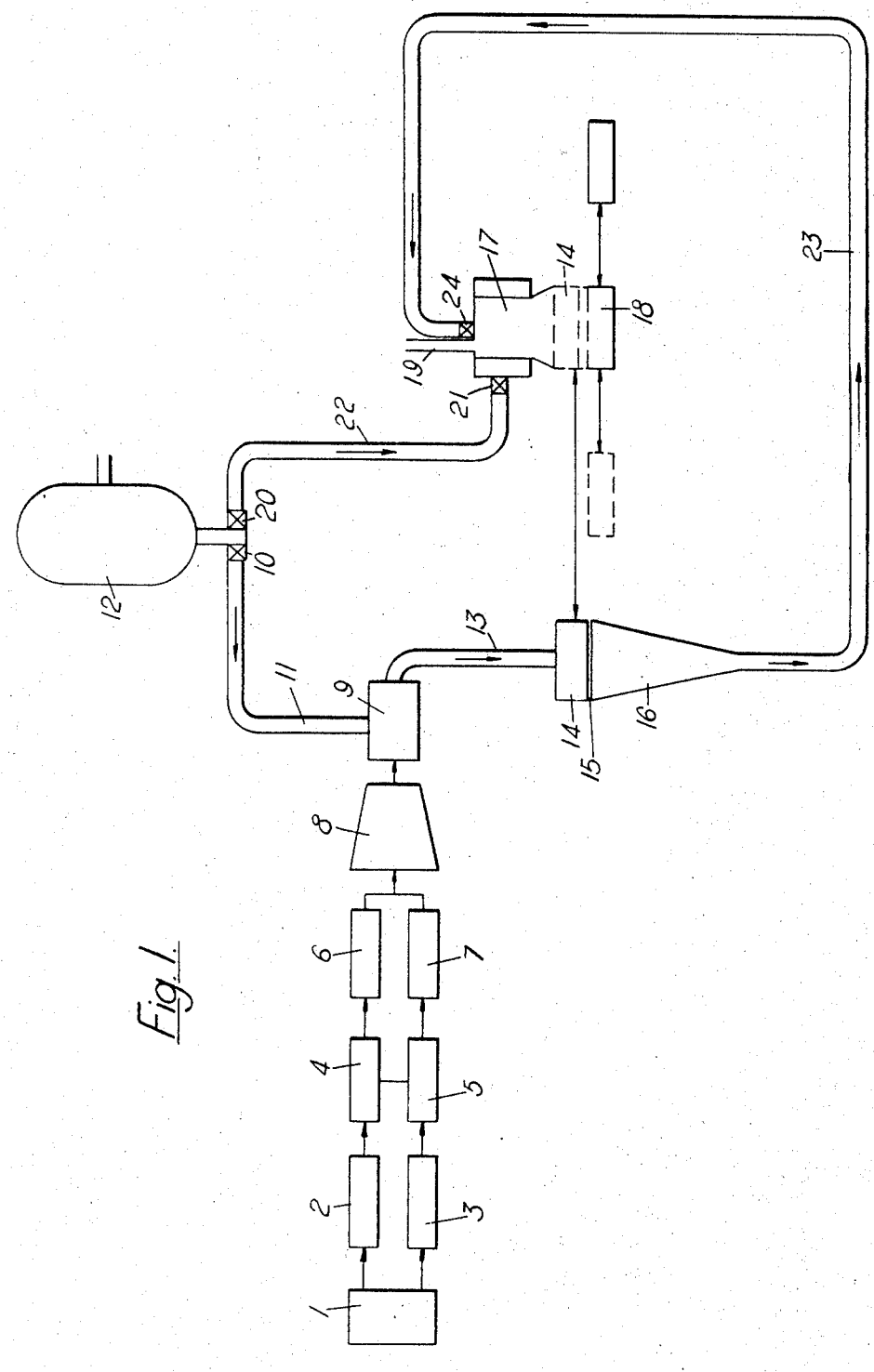
FIG. 1 depicts schematically the general arrangement of a machine embodying the method according to the invention.

It is convenient first to describe the sequence of operations entailed, by referring to FIG. 1. The initial operation is to deliver core sand into a hopper 1, having in its base two shutter-controlled outlets which respectively serve two separate mixers 2 and 3 with metered quantities of the sand. The mixers 2 and 3 are of identical design (which will be described later), but the mixer 2 mixes its sand with a metered quantity of resin, whereas the mixer 3 mixes its sand with a metered quantity of hardener (otherwise termed the catalyst). The respective mixes flow automatically into a corresponding dual interim hopper 4 and 5, and thence through a dual metering unit 6 and 7 into a common feeder means 8. This delivers the combined mixes into a final mixer 9. After this mixer has operated for a few seconds, the final mix is blown (by opening a time-controlled solenoid valve 10 in a delivery pipe 11 of a compressed air reservoir 12) through a pipe 13 into a delivery manifold 14; sufficient material having been delivered by the metering unit 6 and 7 to fill the particular core-box involved. The manifold 14 is designed to cater for the number of feeds obtaining in the core-box.

When the delivery manifold 14 is being charged with the final mix, its base is obturated by a closed shutter 15 fitted at the mouth of an underlying recirculating manifold 16. Having received its charge of the final mix, the delivery manifold 14 is transferred on a slide to the position indicated in dotted lines, where it lies between a blow-head 17 and a core-box assembly 18. Through a closable filler-tube 19, the blow-head 17 is charged initially with inert sand. This is used as a backing material and may conveniently be designated service sand.

The core-box assembly 18 is clamped to the underside of the delivery manifold 14, which itself is clamped against the blow-head 17. By means of time-controlled solenoid valves 20 and 21 in a pipe 22, compressed air from the reservoir 12 is delivered to the blow-head 17 after the core-box 18 has been clamped. In consequence, the mix in the delivery manifold 14 is blown into the core-box assembly 18 and fills this completely. At the end of the timed blow the manifold 14 has become filled with service sand.

The filled core-box assembly 18 is unloaded in the usual manner, along the shuttle path indicated in FIG. 1, and the delivery manifold 14 returns to its initial position above the recirculating manifold 16. The shutter 15 is then opened automatically, as also is the air-valve 10, so that an air-blast (derived from the open valve 10, and delivered through the pipes 11 and 13) blows the service sand out of the delivery manifold 14 and returns it, through the recirculating manifold 16 and a pipe 23, to the blow-head 17. The pipe 23 is fitted with a solenoid valve 24 which, of course, is open only when the valve 21 is closed.

Referring now to the actual machine illustrated, two tubes 25 (FIGS. 2 and 3) connect the outlets of the sand hopper 1 to the respective mixers 2 and 3. These are of the wash-back type, and each of them comprises a trough containing a parallel pair of horizontal shafts carrying numerous radial paddles which are inclined in various directions. The base of the trough is formed with a central longitudinal cusp defining the junction of two part-cylindrical sections that afford radial working clearance for the respective sets of paddles. The tips of the paddles are curved to conform to the shape of the base of the trough, and the paths of movement of the two sets of paddles overlap at the cuspidal zone of the trough. In other words, the two sets of paddles simulate intermeshing but do not touch each other. The shafts of each mixer rotate in opposite directions, such that material in the lower half of the trough is thrown to the center and into the adjoining section. This type of mixer is of relatively small length, and equality of distribution of the resin/sand and hardener/sand is achieved by a reverse-thrust blade pattern of the paddles in the central zone of the respective shafts. The effect of this is that only when a volume of the mix builds up in the rear part of the mixers does the mix feed or overflow forwardly to the interim hopper 4 and 5.

The shafts of the mixers 2 and 3 are driven by an electric motor 26 through reduction gearing 27.

As mentioned with reference to FIG. 1, the two outlets of the sand hopper 1 are shutter-controlled. The shutter is associated with the tubes 25 (FIGS. 2 and 3) and is operated by a pneumatic cylinder 28. The resin and hardener are contained in separate tanks, as at 29 (FIG. 2), and are delivered by separate pumps, as at 30, through pipes 31 and 32 which feed into the tubes 25. The two mixers 2 and 3 segregate the respective sand/resin and sand/hardener mixes. Volumetric metering of the output of the dual metering unit 6 and 7 is effected by a rockable chute 33 actuated by rack gearing 34, and delivering alternately into the twin feeders 8 of the final mixer 9. The latter has a four-bladed rotor 35, with its axis vertical, mounted in a coaxial circular chamber 36, and the arrangement is such that the blades impel the mix from the wall of the chamber 36 towards its center. The wall of the chamber 36 is upwardly convergent, so that loose material falls away from it. Also, the blades scrape the wall and have their leading edge negatively raked. The drive to the rotor of the final mixer 9 is transmitted, from the reduction gearing 27, through a belt-drive 37, a universally-jointed shaft 38 and bevel gearing at 38A.

The delivery manifold 14 is mounted on a pair of rails 39, along which it is slidable to be positioned alternately beneath the blow-head 17 and beneath a transfer manifold 40. The latter is located in vertical alignment with the recirculating manifold 16, and the intervening gap is just sufficient to receive the delivery manifold 14. The pipes 11 and 13, the functions of which have already been described with reference to FIG. 1, are connected to diametrically opposite ports in the chamber 36 of the final mixer 9. Delivery of the final mix or of the residual material (when the final mixer 9 is purged), as the case may be, takes place by way of the transfer manifold 40, to which the outlet end of the pipe 13 is connected. The shutter 15, which, as mentioned with reference to FIG. 1, is fitted at the mouth of the recirculating manifold 16, is actuated by a pneumatic cylinder 41.

The sliding movement of the delivery manifold 14, between its alternative locations, is effected by attaching it to a rod 42 which is operated by a pneumatic cylinder 43.

The blow-head 17 is surmounted by a chamber 44 to which the outlet ends of the pipes 22 and 23 are fitted.

The core-box assembly 18 comprises three parts; a base 18A and two sides 18B. The base 18A is bolted to a trolley 45 movable on wheels 46, and the two sides 18B, split vertically are each bolted onto one of an abutting pair of support plates 47 which are actuated simultaneously, each by one of a pair of hydraulic cylinders 48.

Figure 2:
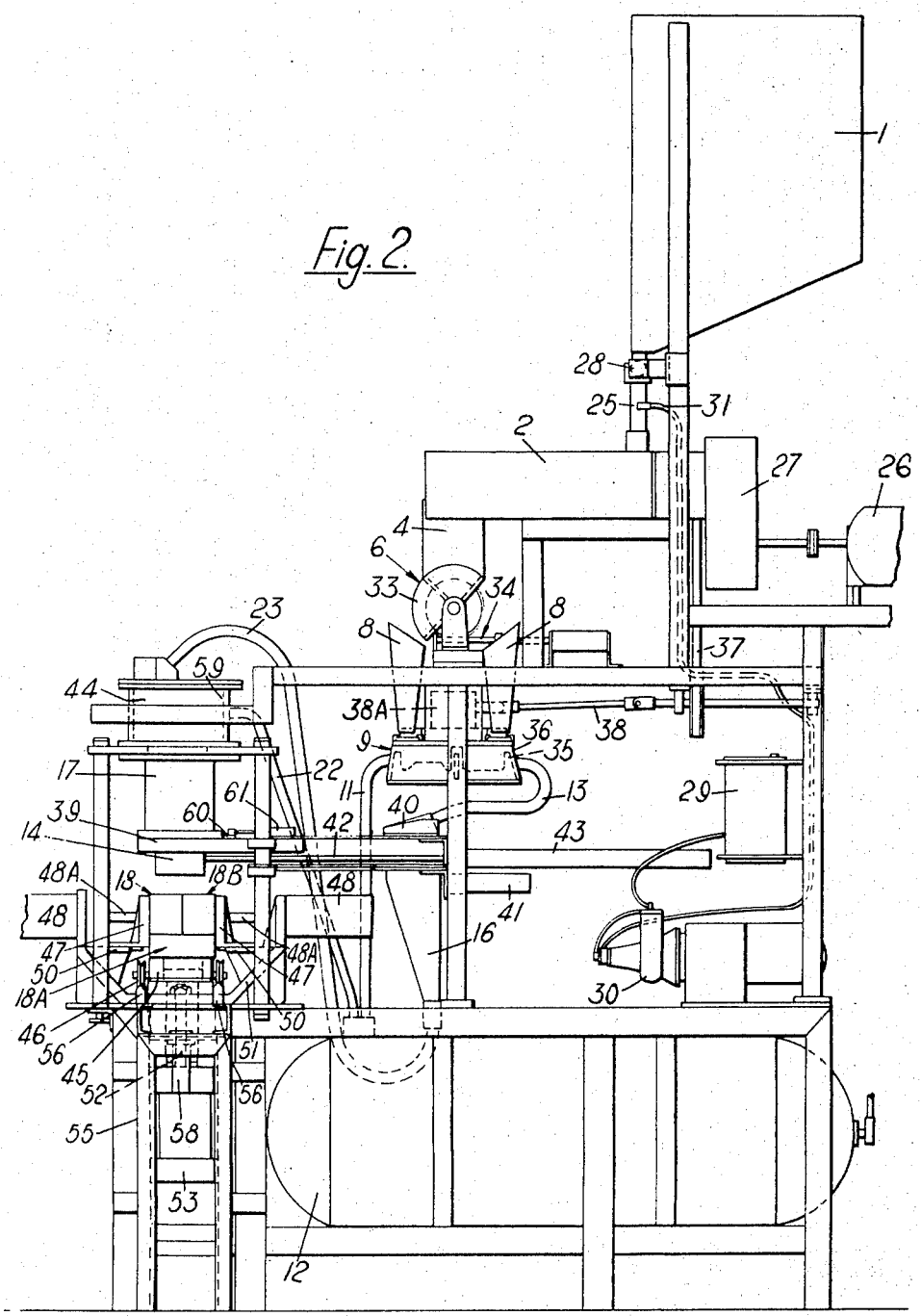
FIG. 2 is a side elevation of a machine for the manufacture of resin-bonded cold-setting foundry cores on a flow-production basis, in accordance with the invention.
Figure 3:
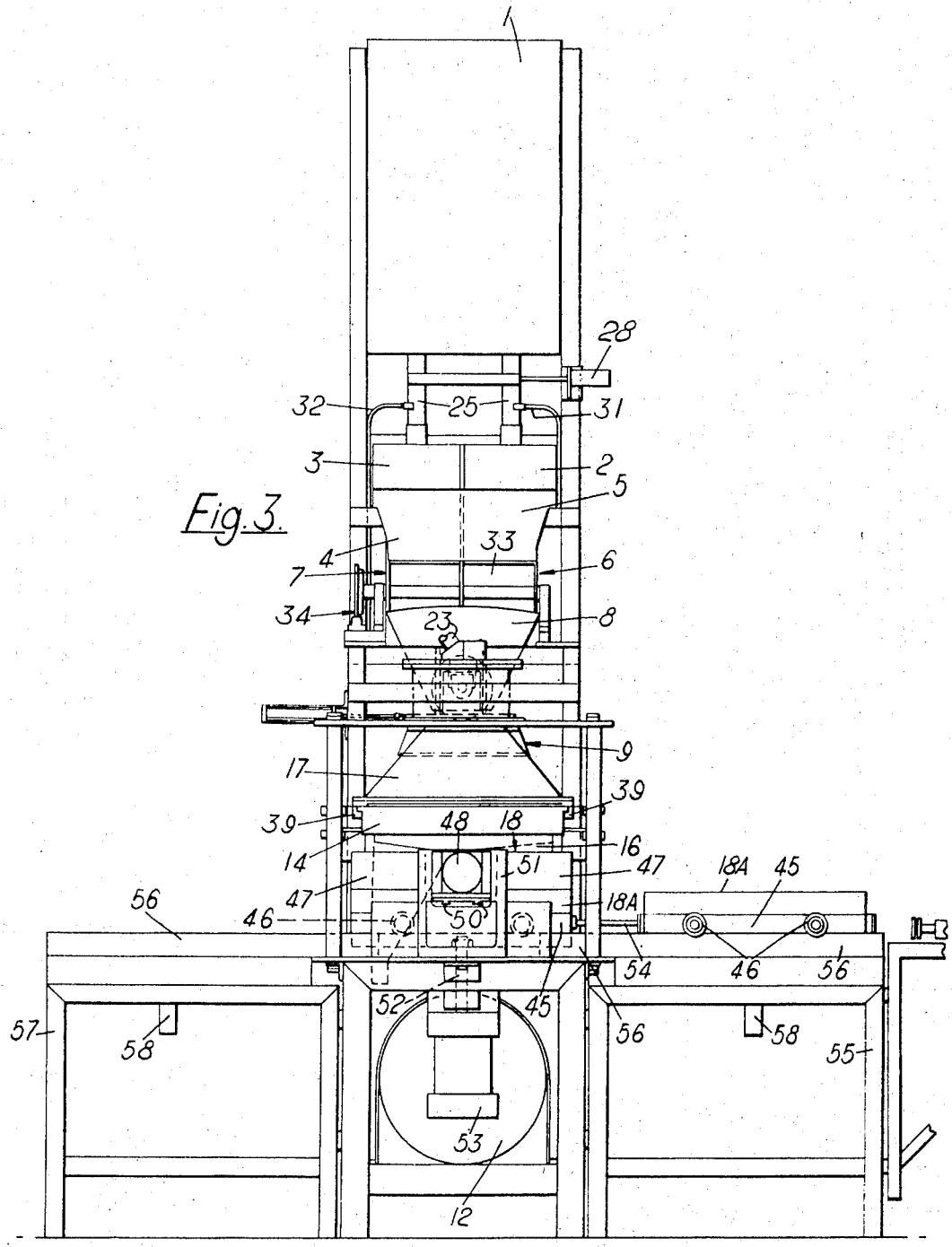
FIGS. 3 and 4 show the machine in end elevation and in plan view respectively.
Figure 4:
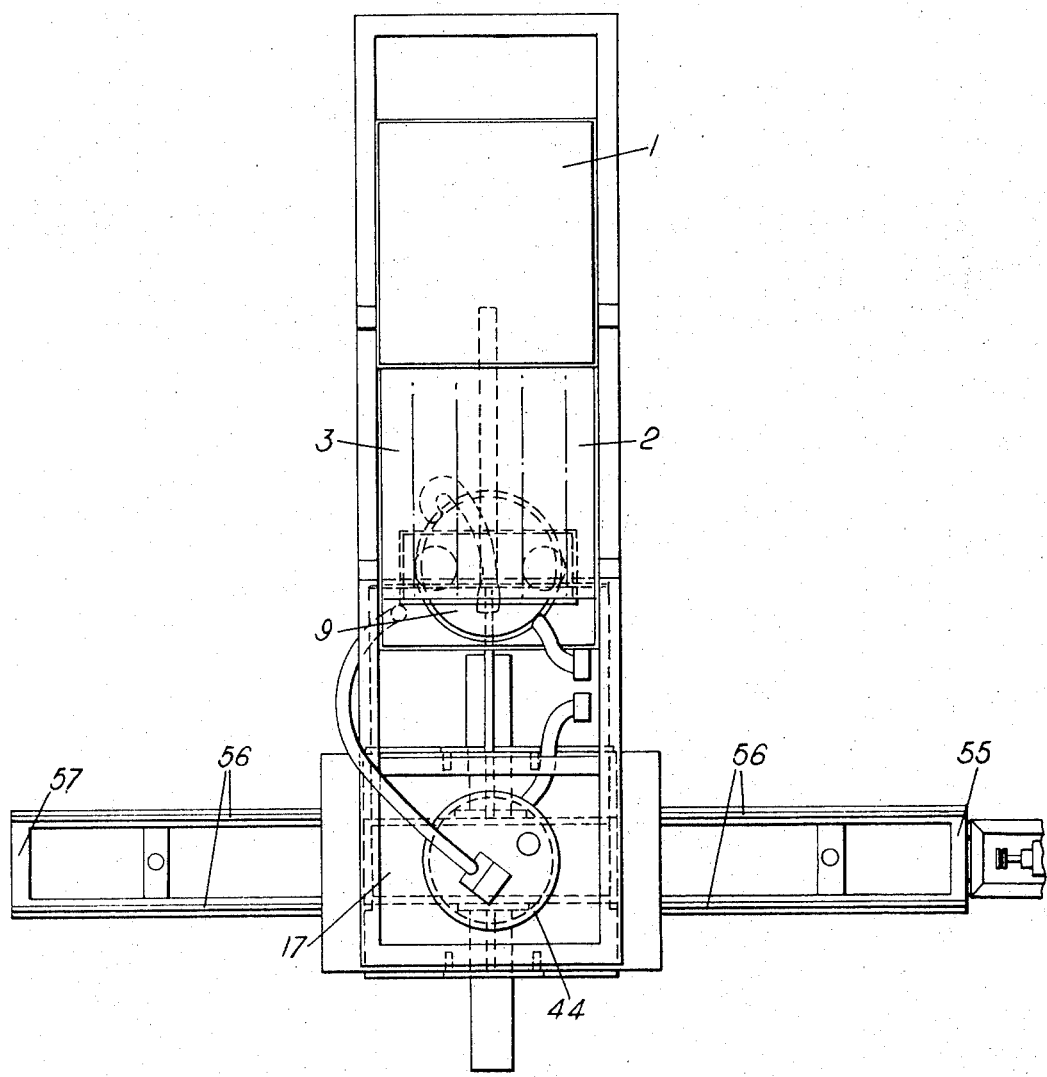

The support plates 47 travel on dovetail slides 50 which, as well as the hydraulic cylinders 48, are mounted on a support-and-clamp frame 51 which is fixed to the piston rod 52 of a hydraulic cylinder 53. In FIG. 2 the piston rod 52 is depicted at the bottom of its travel. When this rod is at the top of its travel the core-box assembly 18 is firmly clamped against the underside of the delivery manifold 14 which is itself clamped against the underside of the blow-head 17.

When the core has been blown, the core-box assembly 18 is lowered, by the retraction of the piston rod 52, and the side support plates 47 are then unclamped by the retraction of piston rods 48A in the cylinders 48.

When the core-box assembly 18 is lowered, a sliding connector 54 (FIG. 3) mates with a second moving trolley 45 on a side table 55. This has a pair of fixed guide rails 56 for the wheels 46 on the trollies 45, as has also a corresponding table 57 at the other side of the machine. The central section of the guide rails 56 is, of course, movable vertically, being attached to the support-and-clamp frame 51. After the two movable trollies 45 have been coupled, they are rolled along the guide rails 56 so that the empty box becomes positioned on the rails under the delivery manifold 14. The sides 18B are then clamped by the cylinders 48, and the core-box assembly 18 is raised to clamp it for the next core to be blown.

When rising, the connector 54 automatically slides out of engagement with the remaining stationary trolley 45. Each of the side tables 55 and 57 is equipped with conventional pneumatically-actuated ejector mechanisms (the pneumatic cylinders of which are indicated at 58) for ejecting the core from the core-box base 18A fixed to the trolley 45.

As is the usual practice, the blow-head chamber 44 is fitted with a woven wire tubular screen 59 which is arranged so that an annular gap exists between it and the interior wall of the chamber 44. The purpose of this arrangement is to achieve the same blowing efficiency at all regions of the blow-head 17, by funnelling the service sand centrally in the chamber 44 and allowing air-pressure to build up around the sand slug.

The blow-head 17 is fitted with a slidable blanking plate 60, the function of which is to obturate the holes in the base of the blow-head, so as to stop the flow of the service sand, when the delivery manifold 14 is not in position beneath the blow-head. The blanking plate 60, which initially is in the blanking position, is automatically moved to the open position by an associated pneumatic cylinder 61 when the piston rod 52 of the hydraulic cylinder 53 starts to clamp the core-box assembly 18 to the delivery manifold 14 (and thence to the blow-head 17 prior to blowing a core). The blanking plate 60 returns to the blanking position after the core has been blown and the core-box assembly 18 has been lowered by the piston rod 52 of the hydraulic cylinder 53.

Figure 7:
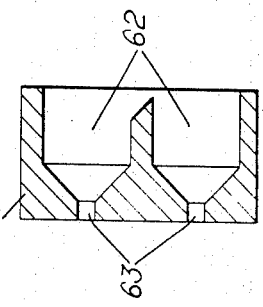
FIGS. 6 and 7 are sections on the lines VI—VI and VII—VII respectively in FIG. 5.
Figure 6:
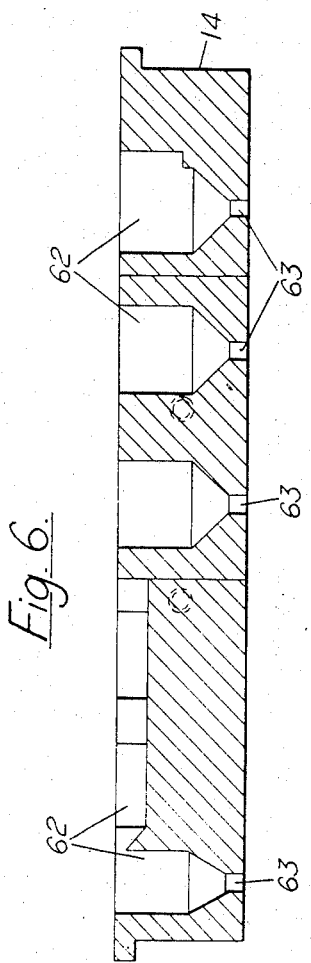
Figure 5:
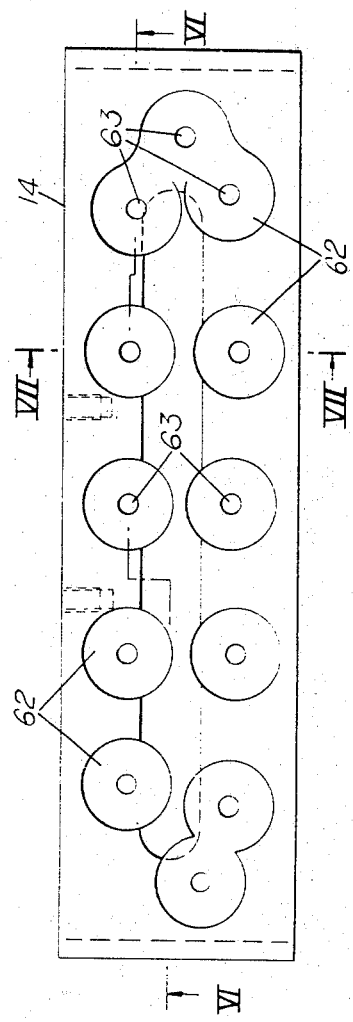
FIG. 5 is a plan view of a delivery manifold that forms part of the machine.

The construction of the delivery manifold 14 is illustrated in FIGS. 5 to 7. Its purpose is to distribute the core-making material in whichever manner is most appropriate to the particular core to be blown. It comprises a metal block having bored in it holes 62 with frusto-conical ends leading to outlets 63, the locations of which correspond to the required core-blowing positions.

I claim:

1. A cold-box core-making machine for producing resin-bonded foundry cores comprising in combination a hopper for containing core sand and having in its base two valve-controlled outlets; two separate mixers connected to receive controlled amounts of sand from respective hopper outlets; means for supplying a metered quantity of resin to one of the mixers; means for supplying a metered quantity of hardener to the other mixer; a final mixer connected to receive the output of said separate mixers and which produces a homogeneous final mix, a source of compressed air connected to said final mixer; a blow-head connected to receive compressed air from said source and resin-free sand from a supply of sand; a delivery manifold; power operated means effective to move said delivery manifold from a first position in which it receives said final mix from said final mixer to a second position beneath said blow-head; first time-controlled valve means for controlling the flow of air from the reservoir to blow the mix from said final mixer into said delivery manifold when said delivery manifold is in said first position; a core-box; means for clamping the delivery manifold between the blow-head and said core-box when said delivery manifold is in its second position; and further time-controlled valve means effective to deliver air from the reservoir to the blow-head after the core-box has been clamped to the delivery manifold.

2. A machine as claimed in claim 1 comprising a dual metering unit connected to receive the two mixes from said separate mixers and to supply to said final mixer a metered quantity of said mixes sufficient to fill said core box.

3. A machine as claimed in claim 1 comprising sand recirculating means extending from a location beneath said first delivery manifold position to said blow-head, closure means for establishing and preventing communication between said sand circulating means and said delivery manifold when said delivery manifold is in said first position, and means for causing air to be supplied to said delivery manifold to expel sand therefrom into said recirculating means when said closure means is open.

4. A machine as claimed in claim 1 in which said delivery manifold is slidable along a pair of rails between its alternative positions.

* * * * *